US009008823B2

(12) United States Patent
Wang et al.

(10) Patent No.: US 9,008,823 B2
(45) Date of Patent: Apr. 14, 2015

(54) CUTTER CHATTER MONITORING METHOD

(75) Inventors: Shih-Ming Wang, Taoyuan County (TW); Chien-Da Ho, Taoyuan County (TW)

(73) Assignee: Chung Yuan Christian University, Taoyuan County (TW)

(*) Notice: Subject to any disclaimer, the term of this patent is extended or adjusted under 35 U.S.C. 154(b) by 469 days.

(21) Appl. No.: 13/455,438

(22) Filed: Apr. 25, 2012

(65) Prior Publication Data

US 2013/0211574 A1    Aug. 15, 2013

(30) Foreign Application Priority Data

Feb. 10, 2012  (TW) .............................. 101104338 A

(51) Int. Cl.
  *G06F 19/00*  (2011.01)
  *B23Q 17/09*  (2006.01)
  *G05B 23/02*  (2006.01)

(52) U.S. Cl.
  CPC ........ *G05B 23/0235* (2013.01); *B23Q 17/0976* (2013.01)

(58) Field of Classification Search
  CPC . B23Q 17/0971; B23Q 17/0976; B23Q 17/12

USPC ................................................... 700/108, 175
See application file for complete search history.

(56) References Cited

U.S. PATENT DOCUMENTS

| 2002/0129653 | A1* | 9/2002 | Seth et al. ....................... 73/594 |
| 2006/0188351 | A1* | 8/2006 | Wang et al. ................... 409/141 |
| 2008/0133439 | A1* | 6/2008 | Ikeda .............................. 706/20 |
| 2009/0069927 | A1* | 3/2009 | Suzuki et al. ................. 700/177 |

* cited by examiner

*Primary Examiner* — Kenneth Lo
*Assistant Examiner* — Chad Rapp
(74) *Attorney, Agent, or Firm* — Rosenberg, Klein & Lee

(57) ABSTRACT

A cutter chatter monitoring method comprises the steps of capturing a cutting vibration acceleration signal; dividing the cutting vibration acceleration signal in each predetermined time period into a plurality of segments; determining whether the vibration acceleration signal of each segment is increased by a multiple greater than a threshold value; performing a Fast Fourier Transform of the cutting vibration acceleration signal in each predetermined time period; calculating a vibration frequency; determining whether the vibration frequency of the cutting vibration acceleration signal is a multiple of a cutter passing frequency; and increasing a main shaft rotating speed of a cutter to avoid cutter chatters if both aforementioned conditions are satisfied.

9 Claims, 4 Drawing Sheets

CUTTER CHATTER MONITORING METHOD

BACKGROUND OF THE INVENTION

1. Field of the Invention

The present invention relates to a monitoring method, in particular to a cutter chatter monitoring method.

2. Description of the Related Art

Cutter chatter is generally caused by self-excited vibrations and considered as an unstable cutting phenomenon, and cutter charters are mainly divided into regenerative chatters, mode coupling chatters), and friction chatters. Among these charters, the regenerative chatter is the most common one. Although present existing high-speed cutting can improve the material removal rate (MRR) by tens of times, yet the whole cutting process may become unstable and produce chatters. As a result, the cutting precision, manufacturing surface roughness, and even the life of cutters and machines are affected adversely. Therefore, it is necessary to maximize the cutting performance of the high-efficiency machine, while suppressing the occurrence of chatters effectively, and it is an important subject for related manufacturers to provide a cutter chatter monitoring method to avoid the production of chatters and suppressing the chatters.

Although many conventional methods are available to avoid cutter chatters, these methods usually adopt a wavelet transform signal analysis with the disadvantages of a complicated computation, a low speed, and a poor effect, and these methods often fail to correct the cutter chatters timely.

SUMMARY OF THE INVENTION

In view of the problems of the prior art, it is a primary objective of the present invention to provide a cutter chatter monitoring method capable of monitoring cutters timely, and increasing a main shaft rotating speed when the cutters produce chatters to retard or avoid the continuous occurrence of cutter chatters, so as to enhance the manufacturing precision, yield rate and optimization. In addition, the invention avoids using the complicated signal transform analysis, and adopts the signal variation analysis and fast Fourier transform for analyzing signals and setting the diagnostic algorithm of the cutter chatters to improve efficiency and reliability of diagnosing abnormal cutting.

To achieve the foregoing objective, the present invention provides a cutter chatter monitoring method comprising the steps of: capturing a cutting vibration acceleration signal; retrieving the cutting vibration acceleration signal in each predetermined time period; dividing the cutting vibration acceleration signal in each predetermined time period into a plurality of segments; determining whether an increased multiple of cutting vibration acceleration signals of each segment is greater than a threshold value; performing a fast Fourier transform of the cutting vibration acceleration signal in each predetermined time period; calculating a vibration frequency of the cutting vibration acceleration signal processed by the fast Fourier transform; determining whether the vibration frequency of the cutting vibration acceleration signal is increased by a multiple of a cutter passing frequency; and increasing a main shaft rotating speed of a cutter, if the cutting vibration acceleration signals is increased by a multiple greater than the threshold value and the vibration frequency of the cutting vibration acceleration signal is a multiple of the cutter passing frequency.

Wherein, the cutter vibrating acceleration in each predetermined time period is divided into 4 segments or 6 segments.

Wherein, the cutter passing frequency is determined by:

$$Hz = \frac{S}{60} \times N$$

and S is the main shaft rotating speed, and $$\frac{S}{60}$$

is the main shaft rotating frequency, and N is the number of cutters.

Wherein, the multiple of increasing the cutting vibration acceleration has a threshold value equal to 2.5 to 3 times of that of a stable cutting.

Wherein, the predetermined time period is one second.

DETAILED DESCRIPTION OF THE PREFERRED EMBODIMENTS

The technical contents of the present invention will become apparent with the detailed description of preferred embodiments and the illustration of related drawings as follows.

Figure 1:
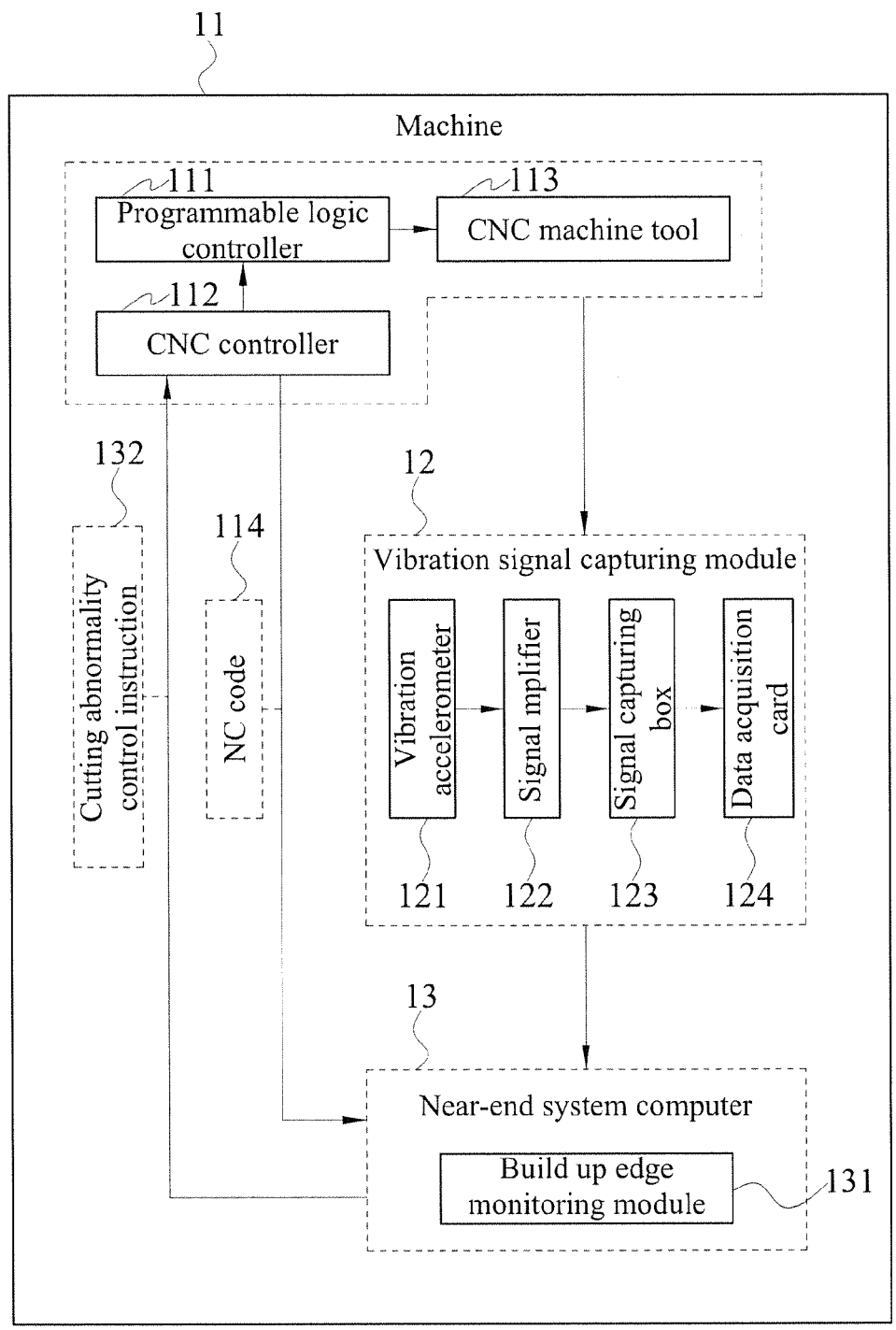
FIG. 1 a system block diagram corresponding to a cutter chatter monitoring method in accordance a preferred embodiment of the present invention.

With reference to FIG. 1 for a system block diagram corresponding to a cutter chatter monitoring method in accordance a preferred embodiment of the present invention, a system using the cutter chatter monitoring method includes a machine 11, a vibration signal capturing module 12 and a near-end system computer 13.

The machine 11 comprises a programmable logic controller (PLC) 111, a computer numerical control (CNC) controller 112 and a CNC machine tool 113.

The vibration signal capturing module 12 comprises a vibration accelerometer 121, a signal amplifier 122, a signal capturing box 123 and a data acquisition card 124 (DAQ).

The near-end system computer 13 comprises a cutter chatter monitoring module 131.

When the machine starts the cutting, the system retrieves a cutting vibration signal through the vibration signal capturing module 12 for processing, and then transmits the cutting vibration signal to the near-end system computer 13 to perform a signal analysis, while transmitting the real-time information of the CNC controller 112 to the near-end system computer 13. Wherein, if the build up edge monitoring module 131 of the near-end system computer 13 diagnoses an abnormal situation, then the cutter chatter monitoring module 131 will transmit a cutting abnormality control instruction 132 to the CNC controller 112.

If the CNC controller 112 receives the cutting abnormality control instruction 132, then the programmable logic controller 111 will be turned on, so as to improve the cutting abnormality. In addition, the diagnostic information and control result are stored in a remote central monitoring platform (not shown in the figure) and provided for a process optimization assisted system to perform a parameter optimization analysis and propose suggestions for a parameter adjustment, so as to avoid recurrence of abnormality in future manufacturing.

Figure 2:
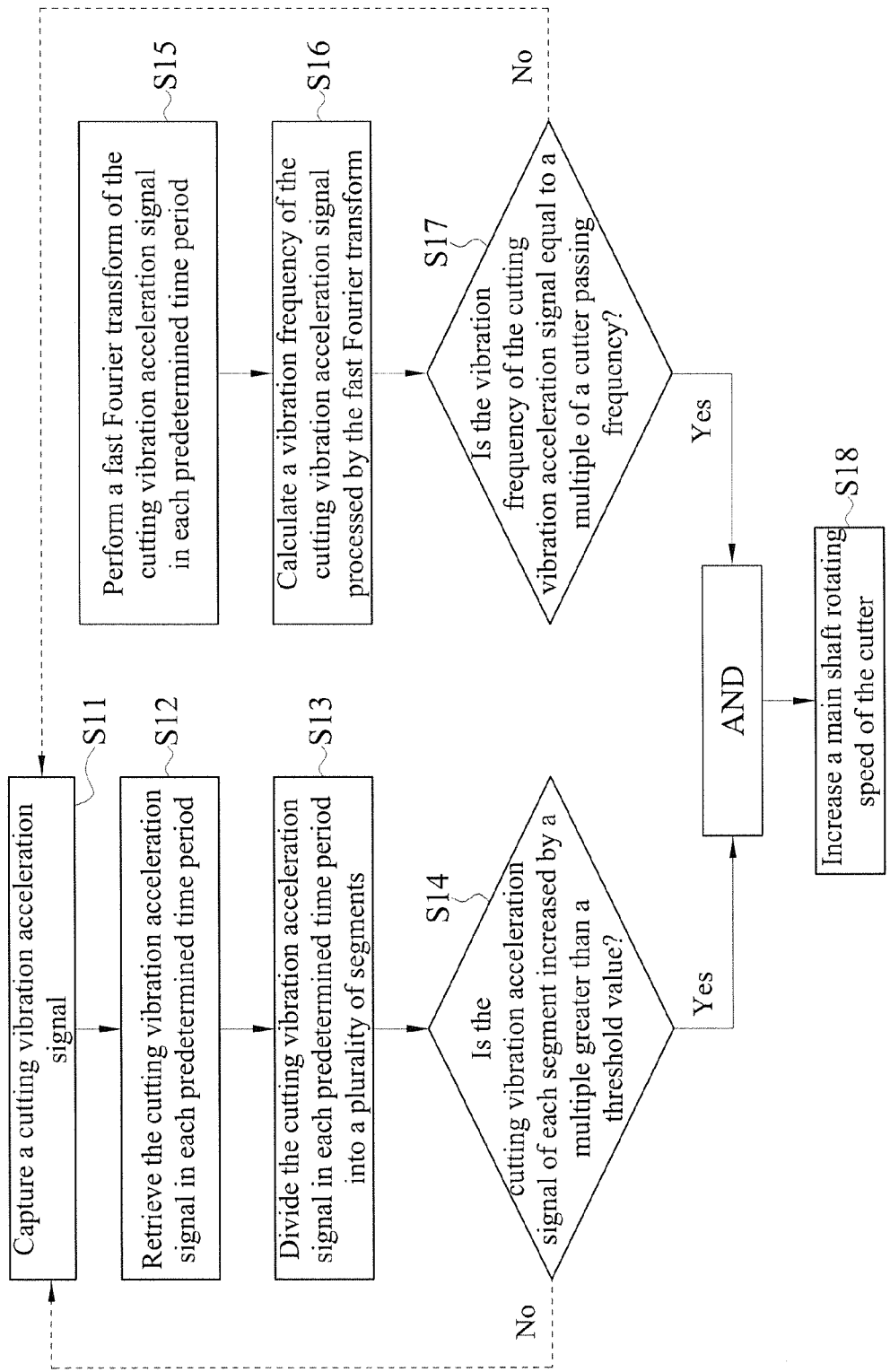
FIG. 2 is a flow chart of a cutter chatter monitoring method in accordance a preferred embodiment of the present invention.

With reference to FIG. 2 for a flow chart of a cutter chatter monitoring method in accordance with a preferred embodiment of the present invention, the cutter chatter monitoring method comprises the following steps:

S11: Capture a cutting vibration acceleration signal.

S12: Retrieve the cutting vibration acceleration signal in each predetermined time period.

S13: Divide the cutting vibration acceleration signal in each predetermined time period into a plurality of segments.

S14: Determine whether the cutting vibration acceleration signal of each segment is increased by a multiple greater than a threshold value.

S15: Perform a Fast Fourier Transform of the cutting vibration acceleration signal in each predetermined time period.

S16: Calculate a vibration frequency of the cutting vibration acceleration signal processed by the fast Fourier transform.

S17: Determine whether the vibration frequency of the cutting vibration acceleration signal is a multiple of a cutter passing frequency;

S18: Increase a main shaft rotating speed of the cutter if the cutting vibration acceleration signal is increased in a multiple greater than the threshold value and the vibration frequency of the cutting vibration acceleration signal is a multiple of the cutter passing frequency.

If the cutter chatter occurs, the vibration accelerometer will capture a signal and the vibration acceleration signal has the following characteristics:

(a): The vibration acceleration signal tends to be diverged.

Figure 3:
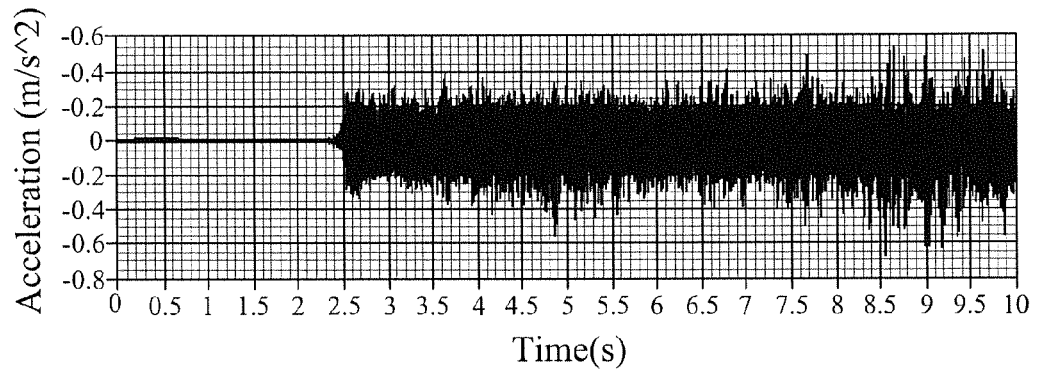
FIG. 3 is a schematic view of a stable cutting signal of a cutter.
Figure 4:
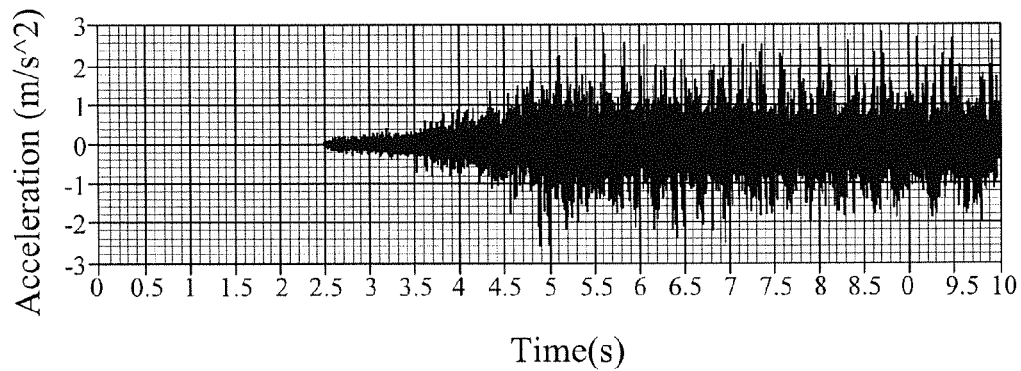
FIG. 4 is a schematic view of a chatter cutting signal of a cutter.

Since the cutting process is unstable, energy keeps being inputted to the cutting system, so that a negative damping if formed in the cutting system to cause severe vibration. With reference to FIGS. 3 and 4 for schematic views of cutting signals at a stable cutting status and with chatters respectively, FIG. 3 shows that the vibration signal is stable during the stable cutting process, but FIG. 4 shows that the vibration signal is diverged at the time between the fourth second and the fifth second, and the vibration is increased spontaneously within 0 to 1 second and particularly within 0 to 0.5 second after the chatter occurs. In addition, the vibration acceleration is increased to a level over 2 to 3 times of that of the stable cutting process if the chatter occurs.

(b) The vibration frequency falls in a neighborhood of a multiple of the cutter passing frequency.

The cutter passing frequency is a vibration frequency generated when a cutter is in contact with a workpiece:

$$\text{Main shaft rotating frequency. (Hz)} = \frac{S}{60} \qquad \text{Equation (1-1)}$$

$$\text{Cutter passing frequency. (Hz)} = \frac{S}{60} \times N \qquad \text{Equation (1-2)}$$

Wherein, S is the main shaft rotating speed (rpm), and N is the number of cutters.

Figure 5:
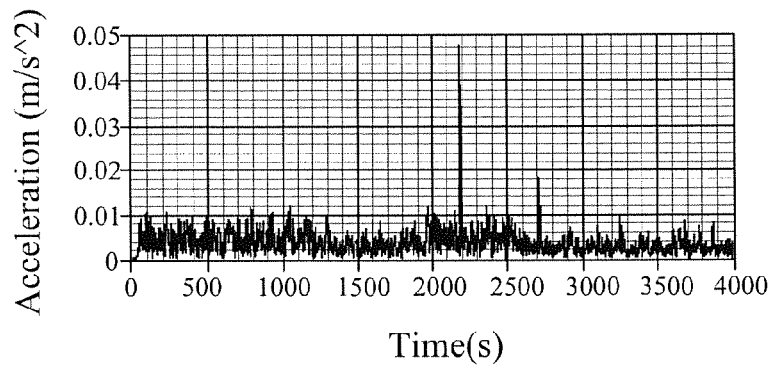
FIG. 5 is a curve of a frequency range of a chatter produced at a main shaft rotating speed of 8000 rpm by the number of cutters equal to 4 and analyzed by a Fast Fourier Transform.

If the chatter occurs, the vibration frequency produced by the cutting will have resonance with a frequency falling in the neighborhood of a multiple of the cutter passing frequency due to the self-excited vibrations. With reference to FIG. 5 for a curve of a frequency range of a chatter produced at a main shaft rotating speed of 8000 rpm by the number of cutters equal to 4 and analyzed by a Fast Fourier Transform, Equations (1-1) and (1-2) indicate that the cutter passing frequency under these conditions is 533.33 (Hz), and the vibration frequency of the chatter falls within the neighborhood of 2133.32 (Hz) within the fourth to the fifth second, which is equal to four times of the cutter passing frequency.

Through the observation of the characteristic (a), the positive direction of the acceleration per second is used for the interpretation, and the signal in one second is divided into a plurality of segments, and the increase of the amplitude from one segment to the other is observed to determine whether the increase exceeds a threshold value, and this signal matches the characteristic of the diverged vibration acceleration signal when the chatter occurs.

Figure 6:
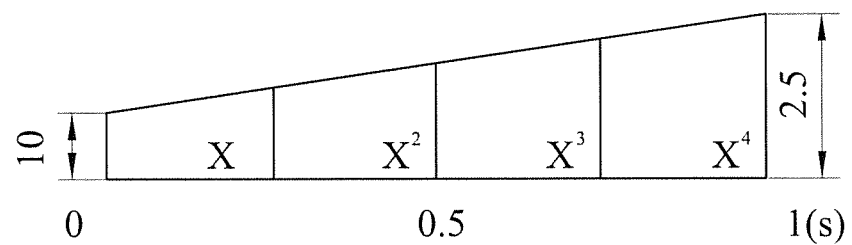
FIG. 6 is a schematic view of the divergence of vibration acceleration of a general chatter.

A general chatter and a severe chatter divide the signal into four and six segments respectively. With reference to FIG. 6 for a schematic view of the divergence of vibration acceleration of a general chatter, the amplitude of the vibration acceleration is increased to 2.5 times of that of the stable cutting state or more within one second. The signal is divided into 4 segments. If the amplitude of the acceleration is increased to 2.5 times of that of the stable status, then each segment has a certain increase over the previous segment, and this increase is called a chatter essential threshold value.

Assumed that the maximum amplitude of each segment is X times of the maximum amplitude of the previous segment, and the vibration of the stable cutting is set to 1, and the diverged vibration is 2.5, and the signal is divided into 4 equal parts, so that X equal to 1.254 can be obtained from Equation (1-3) and (1-4).

$$X^4 = 2.5 \qquad \text{Equation (1-3)}$$

$$X = 1.254 \qquad \text{Equation (1-4)}$$

From the calculation above, the signal is divided into four equal segments, and the maximum amplitude of each segment must be 1.254 times of that of the previous segment, so that the divergence condition is established. For convenience and simplicity, the chatter essential threshold value is set to 1.2.

Figure 7:
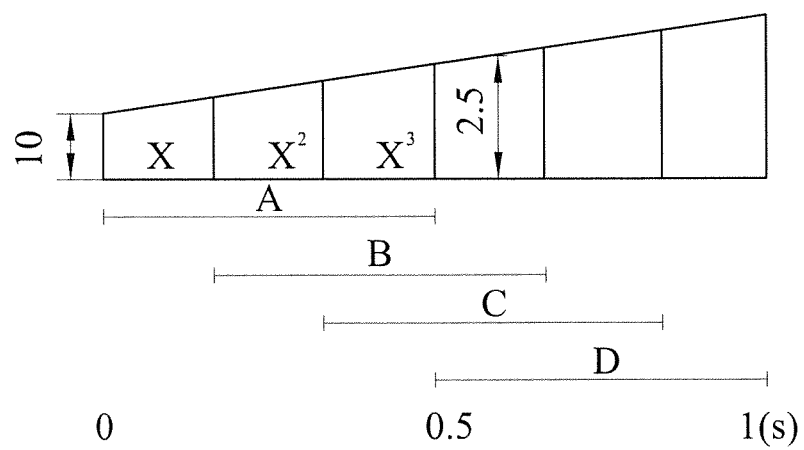
FIG. 7 is a schematic view of the divergence of vibration acceleration of a severe chatter.

With reference to FIG. 7 for a schematic view of the divergence of vibration acceleration of a severe chatter, the amplitude of the vibration acceleration is increased to 2.5 times of that of the stable status or more within 0.5 second. Unlike the general chatter, the signal per second is divided into 6 segments, wherein 3 segments are in a group, and x in the figure indicates A, B, C, and D, which are observed within 0.5 second to check whether the acceleration is increased to 2.5 times or more.

Assumed that the maximum amplitude of the previous segment is X times, and the vibration of the stable cutting is 1, and the diverged vibration is 2.5, and the signal is divided into 3 equal parts, so that X equal to 1.375 can be obtained from Equation (1-5) and (1-6).

$$X^3 = 2.5 \quad \text{Equation (1-5)}$$

$$X = 1.375 \quad \text{Equation (1-6)}$$

From the calculation above, the signal is divided into six segments, and the maximum amplitude of each segment must be 1.357 times of that of the previous segment within the four time periods A, B, C and D before the divergence condition can be established. For simplicity and convenience, the chatter essential threshold value is set to 1.35.

Through the characteristic (b), the characteristic of having a vibration frequency falling in the neighborhood of a multiple of the cutter passing frequency when chatter occur allow us to calculate the cutter passing frequency as long as we know the main shaft rotating speed of the CNC machine tool and the number of cutters used in the manufacture. Fast Fourier Transform (FFT) is used to analyze the cutting vibration signal and compare and determine the relation between the vibration frequency and the cutter passing frequency. If the vibration frequency is a multiple of the cutter passing frequency, then the signal is determined to be matched with the chatter characteristic.

In summation, the cutter chatter monitoring method of the present invention can be summarized as follows:

(1) The signal capturing module is designed to capture the cutting vibration signal by the vibration accelerometer at a sampling frequency equal to 5 times of the cutter passing frequency, and each of the sampling time is set to one second, and each signal retrieved per second is divided into 4 segments or 6 segments.

(2) The increasing tendency of the maximum vibration acceleration of each divided segment (over 2.5-3 times) is determined. Most cutter chatters are formed within 0.5 to 1 second, and the vibration acceleration can be increased up to a level over 2.5-3 times of that of the stable cutting status.

(3) The vibration signal is check to see if it is a multiple of the cutter passing frequency.

(4) If the aforementioned two conditions are satisfied, the system determines that a chatter is produced. The instruction for increasing the main shaft rotating speed by 10% is sent to the CNC controller continuously until the chatter disappears.

In addition, the captured vibration acceleration signal may be a vibration signal other than that captured from a cutting before the cutter is in contact with the workpiece 1. For example, this vibration signal many be generated by a vibration produced by a fast positioning or a vibration produced by stopping the rotation of a main shaft. These vibrations produced factors other than the cutting may cause a misjudgment in a diagnosis, so that the cutter chatter monitoring method cannot be applied to a complicated cutting process. Since the CNC controller 112 can retrieve information such as a NC code 114 from a controller, and the NC code 114 is an NC instruction executed by the CNC controller 112 to determine the current movement of the machine, so as to overcome the aforementioned problems. Table 1 is a list of NC codes 114.

TABLE 1

| NC codes of Monitoring Algorithm | |
|---|---|
| NC Code | Function |
| G00 | Positioning (Fast Feeding) |
| G0 | Positioning (Fast Feeding) |
| G28 | Reset to Origin |
| M00 | Stop program |
| M0 | Stop program |
| M01 | Selectively stop |
| M1 | Selectively stop |
| M02 | Program ends |
| M2 | Program ends |
| M05 | Stop main shaft |
| M5 | Stop main shaft |
| M06 | Change cutter automatically |
| M19 | Position main shaft |
| M30 | Program ends |

In summation, the cutter chatter monitoring method of the present invention adopts the signal variation analysis and the Fast Fourier Transform to analyze vibration signals timely and set the algorithm for diagnosing abnormal cutting to improve the efficiency and reliability of the diagnosis of abnormal cutting.

In addition, the cutter chatter monitoring method of the present invention also includes programs to capture the NC code executed in the CNC controller and the machine status as the data for assisting the diagnosis to avoid misjudgment, and improve the stability of the system diagnosis.

While the invention has been described by means of specific embodiments, numerous modifications and variations could be made thereto by those skilled in the art without departing from the scope and spirit of the invention set forth in the claims.

In summation of the description above, the present invention improves over the prior art and complies with patent application requirements, and thus is duly filed for patent application.

What is claimed is:

1. A cutter chatter monitoring method, comprising the steps of:

capturing a cutting vibration acceleration signal;

retrieving the cutting vibration acceleration signal in each predetermined time period;

dividing the cutting vibration acceleration signal in each predetermined time period into a plurality of segments;

determining whether an increased multiple of cutting vibration acceleration signals of each segment is greater than a threshold value;

performing a fast Fourier transform of the cutting vibration acceleration signal in each predetermined time period;

calculating a vibration frequency of the cutting vibration acceleration signal processed by the fast Fourier transform;

determining whether the vibration frequency of the cutting vibration acceleration signal is increased by a multiple of a cutter passing frequency, wherein the cutter passing frequency is determined by a main shaft rotating speed S and a number of cutters N; and increasing a main shaft rotating speed of a cutter, when the cutting vibration acceleration signals is increased by a multiple greater than the threshold value and the vibration frequency of the cutting vibration acceleration signal is a multiple of the cutter passing frequency, wherein the cutter passing frequency is determined by $$\text{Hz} = \frac{S}{60} \times N, \text{ and } \frac{S}{60}$$

is a main shaft rotating frequency.

2. The cutter chatter monitoring method of claim 1, wherein the cutter vibrating acceleration in each predetermined time period is divided into at least 4 segments or 6 segments, and when the cutter vibrating acceleration is divided into 4 segments, the chatter corresponds to a general chatter status, and when the cutter vibrating acceleration is divided into 6 segment, the chatter corresponds to a severe chatter status.

3. The cutter chatter monitoring method of claim 2, wherein when the cutter vibrating acceleration is divided into 4 segments, the chatter essential threshold value is 1.2, and when the cutter vibrating acceleration is divided into 6 segments, the chatter essential threshold value is 1.35.

4. The cutter chatter monitoring method of claim 1, wherein the multiple of increasing the cutting vibration acceleration signal has a threshold value equal to 2.5 to 3 times of that of a cutter in a stable cutting state.

5. The cutter chatter monitoring method of claim 1, wherein the predetermined time period is one second.

6. The cutter chatter monitoring method of claim 1, wherein the main shaft rotating speed of the cutter is increased by 10%.

7. The cutter chatter monitoring method of claim 1, wherein the cutting vibration acceleration signal is captured by a vibration signal capturing module, and the vibration signal capturing module comprises a vibration accelerometer, a signal amplifier, a signal capturing box and a data acquisition card.

8. The cutter chatter monitoring method of claim 7, wherein the vibration signal capturing module compares an NC code to determine whether to capture a vibration signal generated by a factor other than cutting.

9. The cutter chatter monitoring method of claim 1, wherein the NC code is generated according to a status of a fast feed orientation of a cutter or a shutdown of the main shaft of the cutter.

* * * * *